June 3, 1952 R. N. GREEN 2,599,105
FASTENER DEVICE
Filed Oct. 28, 1947 2 SHEETS—SHEET 1
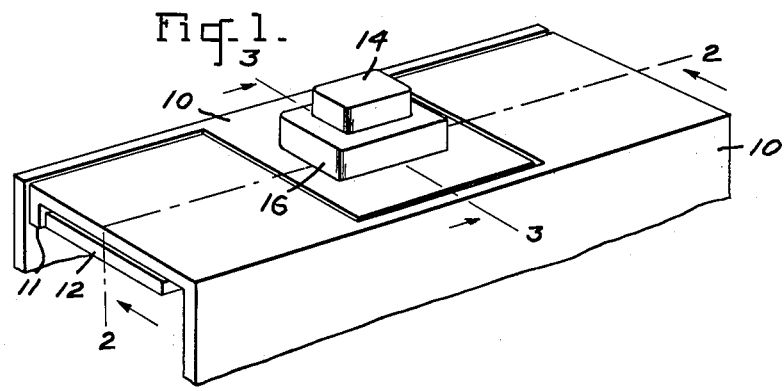
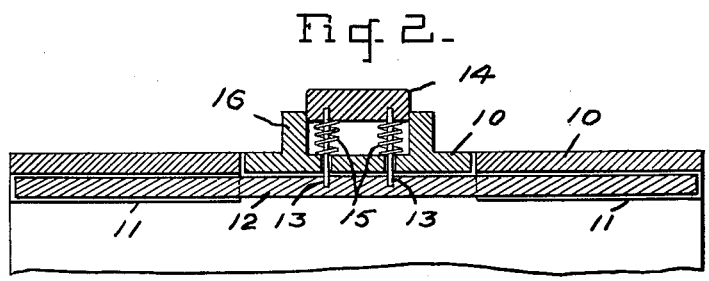
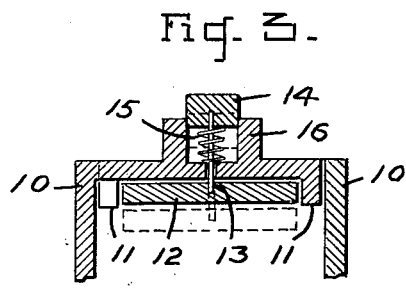
INVENTOR.
ROBERT N. GREEN
BY
Stowell & Evans June 3, 1952  R. N. GREEN  2,599,105
FASTENER DEVICE
Filed Oct. 28, 1947  2 SHEETS—SHEET 2
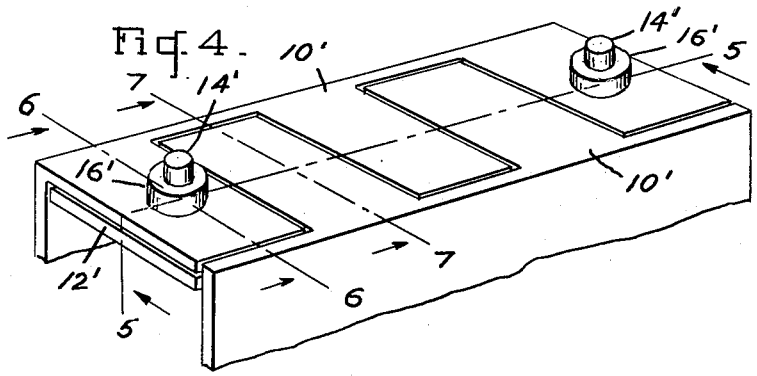
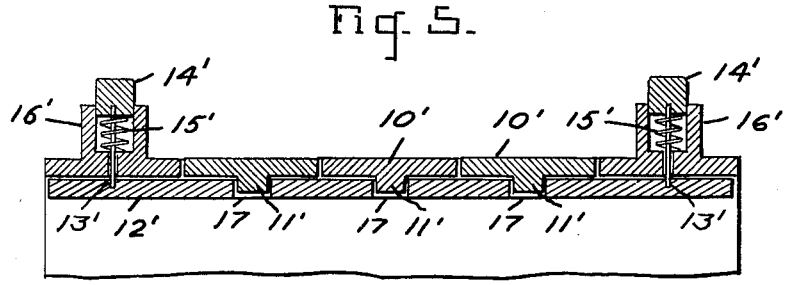
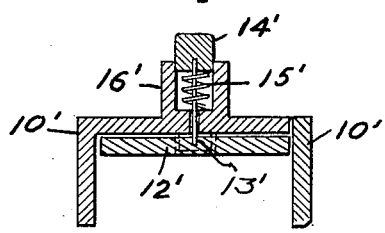
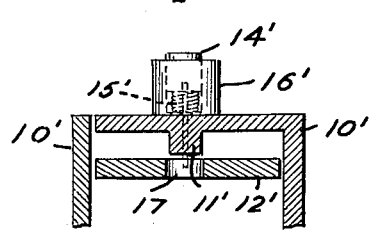
INVENTOR.
ROBERT N. GREEN
BY
Stowell & Evans Patented June 3, 1952

2,599,105

UNITED STATES PATENT OFFICE 2,599,105

FASTENER DEVICE

Robert N. Green, New York, N. Y.

Application October 28, 1947, Serial No. 782,594

5 Claims. (Cl. 292—162)

This invention relates to fasteners for travelling bags, handbags, brief cases, kitbags, suit cases and the like.

A principal object of the invention is to provide a fastener device of simple and rugged construction wherein the latching members which positively hold the closure members in the closed position are of substantial size and strength and provide a large area of engagement.

Another object is to provide such a fastener wherein any force tending to open it acts in such a way as to insure a more positive closure.

A further object of the invention is to provide such a fastener which may be readily applied to all ordinary types of bags.

These and other objects and advantages are attained by the fastener of the invention which includes opposed complementary base members provided with dependent keepers projecting downwardly from each of the base members, a latch member carried by one of the base members and urged into engagement with the dependent keepers, and means for depressing the latch member out of engagement with the dependent keepers.

The invention will be more particularly described with reference to the illustrative embodiments of the invention shown in the accompanying drawings, in which:

Fig. 1 is a perspective view of a fastener embodying the principles of the invention in the closed position;

Fig. 2 is a section on line 2—2 of Fig. 1;

Fig. 3 is a section on line 3—3 of Fig. 1;

Fig. 4 is a perspective view in the closed position of a modified form of the fastener of the invention;

Fig. 5 is a section on line 5—5 of Fig. 4;

Fig. 6 is a section on line 6—6 of Fig. 4;

Fig. 7 is a section on line 7—7 of Fig. 4.

In the fastener illustrated in Figs. 1 to 3, 10 are opposed complementary base members which are attachable to a bag or the like. They carry the other elements of the fastening device and are provided with dependent keepers 11 which project downwardly along the leading edge of the base members, forming therein a pocket for the latch member 12. The latch bar 12 is carried by one of the base members and when in the closed position fits snugly between the keepers 11 of the complementary base members holding the base members in the closed position; any force tending to force these base members apart acts in such a way as to urge the latch member more securely between the latch keepers 11.

Plungers 13 are attached to the latch bar and project through the top of one of the base members. A button 14 is attached to the top of these plungers forming a flange against which the spring 15 bears at one end, the other end of the spring bearing against the top of the base member 10. The button may conveniently be positioned within a suitable boss 16. By depressing plungers 13 the latch bar is depressed as shown in dotted lines in Fig. 3. The latch bar when depressed disengages its keepers 11 allowing the base members to be separated. Upon closing the base members, springs 15 return the latch bar to its position of engagement with the keepers depending from the opposed base members, holding them in the closed position.

A modification of the above described fastener wherein the keepers are dependent pins which engage corresponding ports in the latch bar is illustrated in Figs. 4 to 7.

Attached to the base members 10' are dependent keeper pins 11' which project downwardly from the base members. These keepers engage the ports 17 in latch bar 12' when the base members are in the closed position. Plungers 13' are attached to the latch bar and project through the top of one of the base members.

Springs 15' surrounding the plungers and bearing at one end against the buttons 14' and the other end against the top of the base member hold the latch bar in the engaged position. By depressing buttons 14' the latch bar 12' is depressed as shown in Fig. 7 disengaging its keepers 11' allowing the base members to be separated.

The base members of the fastening device of the invention may be an integral part of the frame of a handbag or other container or may be attached to the frame of the container.

It will be seen that the fastener of the invention provides a rugged and simple latch mechanism which is adapted to use with a wide variety of bags, cases and other containers and which may be varied widely in form and arrangement without departing from the principles of the invention.

I claim:

1. A bag fastening device, comprising a frame having opposed complementary base members, dependent keepers projecting downwardly from each of said base members, a latch member carried by one of said base members and urged into engagement with said dependent keepers, and means for depressing said latch member out of engagement with the dependent keepers of both of said base members.

2. A bag fastening device comprising a pair of complementary base members, each of said base members having at least one element extending therefrom and shaped to interlock in the closed position to form the top of the fastener, dependent keepers projecting inwardly of the fastener from at least two of the opposed top forming elements, a latch bar within said base members and substantially co-extensive with the interior surface of the top of the fastener carried by at least one of the top forming elements, said latch bar having a substantially smooth bottom surface, spring means urging said latch bar into engagement with said inwardly projecting keepers, said keepers being confined substantially within a zone above the bottom surface of the latch bar in the latched position, whereby when the fastener is latched the interior surface of the fastener is substantially smooth, and means for depressing said latch bar out of engagement with said dependent keepers.

3. A bag fastening device comprising a pair of complementary base members, each of said base members having at least one element extending therefrom and shaped to interlock in the closed position to form the top of the fastener, dependent keepers projecting inwardly of the fastener along the leading edge of at least two of the opposed top forming elements, a latch bar within said base members and substantially co-extensive with the interior surface of the top of the fastener carried by at least one of the top forming elements, said latch bar having a substantially smooth bottom surface, spring means urging said latch bar into engagement with said inwardly projecting keepers, said keepers being confined substantially within a zone above the bottom surface of the latch bar in the latched position, whereby when the fastener is latched the interior surface of the fastener is substantially smooth, and means for depressing said latch bar out of engagement with said dependent keepers.

4. A bag fastening device comprising a pair of complementary base members, each of said base members having at least one element extending therefrom and shaped to interlock in the closed position to form the top of the fastener, dependent keeper pins projecting inwardly of the fastener from at least two of the opposed top forming elements, a latch bar within said base members and substantially co-extensive with the interior surface of the top of the fastener carried by at least one of the top forming elements, keeper ports in said latch bar adjacent said keeper pins, said latch bar having a substantially smooth bottom surface, spring means urging said latch bar into engagement with said inwardly projecting keeper pins, said pins being confined substantially within a zone above the bottom surface of the latch bar in the latched position, whereby when the fastener is latched the interior surface of the top of the fastener is substantially smooth, and means for depressing said latch bar out of engagement with the dependent keeper pins.

5. A bag fastening device comprising a pair of complementary base members, each of said base members having at least one element extending therefrom and shaped to interlock in the closed position to form the top of the fastener, dependent keepers projecting inwardly of the fastener from at least two of the opposed top forming elements, a latch bar within said base members and substantially co-extensive with the interior surface of the top of the fastener suspended from at least two points from at least one of the top forming elements, thereby substantially reducing any turning moment in the latch bar when the fastener is in the open position, said latch bar having a substantially smooth bottom surface, spring means urging said latch bar into engagement with said inwardly projecting keepers, said keepers being confined substantially within a zone above the bottom surface of the latch bar in the latched position, whereby when the fastener is latched the interior surface of the fastener is substantially smooth, and means for depressing said latch bar out of engagement with said dependent keepers.

ROBERT N. GREEN.

REFERENCES CITED

The following references are of record in the file of this patent:

UNITED STATES PATENTS

| Number | Name | Date |
| --- | --- | --- |
| 314,345 | Prahar | Mar. 24, 1885 |
| 1,401,882 | Cozzo | Dec. 27, 1921 |
| 1,857,943 | Dawicki | May 10, 1932 |